Dec. 2, 1947.  V. F. HANSON  2,432,013
MEASUREMENT OF LEAKAGE RESISTANCE IN ELECTROLYTIC CELL SYSTEMS
Original Filed April 16, 1942
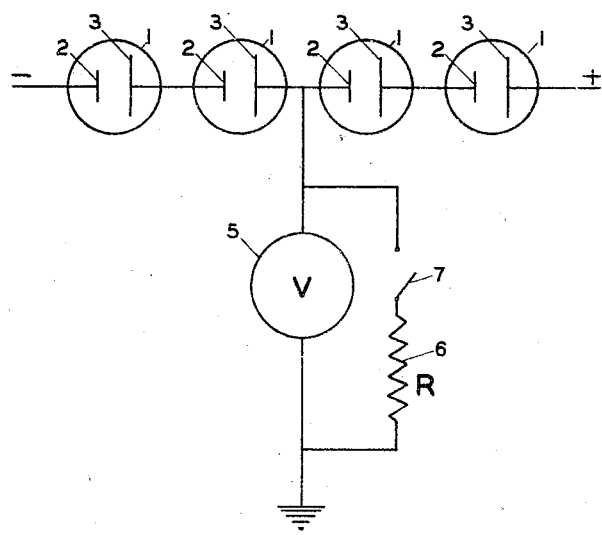
INVENTOR.
VICTOR F. HANSON
BY
ATTORNEY Patented Dec. 2, 1947

2,432,013

UNITED STATES PATENT OFFICE

2,432,013

MEASUREMENT OF LEAKAGE RESISTANCE IN ELECTROLYTIC CELL SYSTEMS

Victor F. Hanson, Pasco, Wash., assignor to E. I. du Pont de Nemours & Company, Wilmington, Del., a corporation of Delaware Original application April 16, 1942, Serial No. 439,224. Divided and this application January 3, 1944, Serial No. 516,803

1 Claim. (Cl. 175—183)

This invention relates to the operation of systems of electrolytic cells operating on direct current and more particularly to the location of ground faults in such systems.

This application is a division of my copending application Serial No. 439,224, filed April 16, 1942, issued as Patent No. 2,347,408.

In systems of electrolytic cells a group or bank of electrolytic cells usually consists of a number of cells connected in series, the ends of the bank being connected to a suitable source of direct current, for example, a rotary converter. Normally in such systems, the entire direct current circuit is insulated from ground. However, in practice it is impossible to maintain perfect insulation and under the best of operating conditions there is always likely to be a certain small amount of leakage of electric current to ground from various parts of the cell circuit. So long as such leakage is small, it is not particularly disadvantageous. However, if a fault occurs anywhere in the system which permits a considerable amount of current to leak to the ground, serious disadvantages may result. Such serious leakages of current may, for example, create serious operating hazards and operators in contact with the ground may receive serious shocks when coming into contact with parts of the cell circuit. Also the flow of large amounts of current to ground causes serious electrolytic corrosion of equipment. Further, it constitutes an unnecessary waste of electric current. It is therefore very desirable to promptly locate a point at which any such serious leakage of current occurs so that the condition may be quickly cured. The location of such current leakage is often very difficult to find by any visual inspection and heretofore there has been no adequate method of locating such faults except by means of visual inspection or laborious tests which require undue periods of time to accomplish. The problem of detecting and locating such ground faults is almost wholly confined to the cell bank, since other parts of the D. C. circuit are relatively easy to maintain in substantially perfectly insulated condition.

An object of the present invention is to provide a quick and easy method for locating ground faults in electrolytic cell systems. Another object is to provide a means for promptly detecting the existence of such ground faults and to determine the extent of ground leakage at such faults. Another object is to provide an improved method and apparatus for measuring the resistance between an electrolytic cell circuit and ground, and thereby to readily detect the existence and degree of any ground leakage. Still other objects will be apparent from the following description.

The above objects are attained in accordance with the present invention by periodically measuring the resistance between the electrolytic cell, D. C. circuit and ground and measuring the voltage at a selected point between the cell circuit and ground and, from the results of these periodic measurements, determining the degree and location of the current leakage by a simple computation. Various known electrical instruments may be utilized for the purpose of making said measurements and the present invention is not restricted to any particular method or apparatus for making such measurements. However, the efficacy of the invention will depend upon the accuracy with which such measurements are made and hereinafter certain preferred methods for making these measurements and apparatus are described.

The extent of ground leakage is measured by the total resistance of the cell circuit to ground and this may be measured at any desired point in the cell circuit. In order to locate the position of the ground fault according to my invention, the voltage measurement must be made at a selected point in the cell circuit. Ordinarily I prefer to measure the voltage at the midpoint of a cell bank consisting of a group of cells connected in series.

If a cell system comprising a bank of an even number of cells, for example, 8 cells connected in series, is perfectly insulated from the ground, the resistance between the cell system and ground will be infinity and the voltage between the cell circuit measured at the midpoint in the cell bank and the ground will be 0. If now leakage to ground occurs, for example, in one of the cells between the midpoint and the positive end of the bank, a voltmeter connected to ground at the midpoint will show a reading of negative voltage. Thus, the negative reading on the voltmeter will indicate that the fault has occurred on the positive side of the cell bank. If now the resistance between the cell bank and the ground is measured, it will be found to be less than infinity and if the aforesaid fault is the only fault in the system, this resistance will be the resistance of the fault and thereby indicate the extent of ground leakage.

However, as stated above, normally there will be a number of small leakages in the cell system, usually more or less distributed throughout the entire cell bank. Such small leakages are not of serious consequence and usually may be disregarded. However, these small leakages will result in a resistance to ground of the cell bank which is of finite quantity and a voltage to ground at the midpoint of the bank which will be 0 only when the leakages are equal on both sides of the midpoint. If, however, in such a normal cell system a large cell leakage occurs at any point in the bank, the total resistance of the cell bank will correspondingly decrease and there will be a corresponding positive or negative reading on a voltmeter connected to ground at the midpoint. Therefore by periodically measuring the resistance and voltage as aforesaid, I am able to promptly detect any such large leakage by comparison of the readings obtained. Moreover, I have found that I can promptly locate the position of the fault by application of the following formula:

$$N = \frac{E_0 R - E R_0}{e(R_0 - R)}$$

where $N$ = number of cells from the point at which the voltage was measured to the position of the fault.

$E_0$ = voltage to ground of the cell bank before fault occurred, measured at a selected point.
$E$ = voltage to ground of the cell bank after fault occurred, measured at the same point as $E_0$.
$R_0$ = resistance of the cell bank before fault occurred.
$R$ = resistance of the cell bank after fault occurred.
$e$ = voltage drop per cell.

The above formula assumes that the voltage drop ($e$) from cell to cell in the series-connected bank of cells is substantially the same throughout the bank. This is substantially true for the conventional bank of cells wherein the electrolyte, current density and other cell characteristics are substantially the same throughout the cell bank. The relatively small differences in individual cell voltages which may occur throughout the cell bank cause only a negligible error in the use of the above formula.

The extent of ground leakage at the fault is indicated by the resistance readings, and can be determined in terms of the resistance of the fault by application of the following formula:

$$R_x = \frac{R_0 R}{R_0 - R}$$

where $R_0$ and $R$ have the same meaning as indicated in the previous paragraph and $R_x$ is the resistance of the fault.

In an electrotlytic installation which comprises a number of separate cell banks having cells connected in series, it is often preferable to utilize a single voltmeter or single resistance measuring instrument for the entire group and this may be done by providing the necessary connections from the various cell banks to a multiple switch at the instruments, which are placed in a central or convenient location.

For the utilization of my invention it is not essential that the voltage be measured at the midpoint of the cell bank, provided that the voltage is measured at the same point before and after the occurrence of the ground leakage fault which is thereby indicated and located. The value $N$ will be the number of cells from the point at which the voltage measurements are made. The resistance of the cell bank to ground may be measured at any desired point, not necessarily the same point before and after the occurrence of the fault.

The appended drawing is a diagrammatic illustration of an electrolytic cell system showing the application to such systems of devices for measuring the voltage and resistance as above described.

The figure illustrates a particular device for measuring both the voltage to ground and the resistance of the cell bank to ground. This consists of voltmeter 5 provided with a shunt circuit which contains shunt resistance 6 and shunting switch 7 which may be a single pole, single throw switch, or any other conventional switch of suitable design. Shunt resistance 6 is a resistance of known value. When switch 7 is open, the voltage to ground may be read from voltmeter 5. When switch 7 is then closed, the voltage as shown on the voltmeter will be different because of the shunt resistance. The resistances of the cell bank to ground before and after occurrence of the fault then may be determined by computation from the following formulas:

$$R_0 = R_s \cdot \frac{E_1 - E_2}{E_2} \text{ and } R = R_s \cdot \frac{E_3 - E_4}{E_4}$$

where:

$R_0$ = resistance of the cell bank to ground before fault occurred.
$R$ = resistance of the cell bank to ground after fault occurred.
$R_s$ = shunt resistance.
$E_1$ = voltage of cell bank to ground (switch 7 open) before fault occurred.
$E_2$ = shunted voltmeter reading (switch 7 closed) before fault occurred.
$E_3$ = voltage of cell bank to ground (switch 7 open) after fault occurred.
$E_4$ = shunted voltmeter reading (switch 7 closed) after fault occurred.

The location of the fault then may be determined as described above from the formula:

$$N = \frac{E_0 R - E R_0}{e(R_0 - R)}$$

wherein: $E_0 = E_1$; and $E = E_3$.

By mathematical derivation, it is apparent that the value of $N$ may also be determined without separately computing the values of $R_0$, and $R$, i. e., by using the following formula:

$$N = \frac{E_2 E_3 (E_1 + E_4) - E_1 E_4 (E_2 + E_3)}{e(E_1 E_4 - E_2 E_3)}$$

One disadvantage of the method of measuring the cell bank resistance as illustrated by the figure is that occasionally the voltage reading may be zero because of balanced leakage conditions in the cell bank. In such cases, it is necessary to change the location of the instrument so as to take the voltage readings at some point other than the midpoint of the cell bank.

I claim:

The method for measuring the resistance to ground in a system of direct current electrolytic cells which comprises measuring the voltage to ground with a voltage measuring means of given resistance at a selected point in said system, measuring the voltage to ground at the same point with a voltage measuring means of the same resistance as the first-named voltage measuring means while shunting a given portion of said current from said point to ground whereby the resistance to ground may be computed from the formula:

$$R = \frac{R_s \times (E_1 - E_2)}{E_2}$$

where:

R is the resistance to ground in said system.
$R_s$ is the resistance in the shunt circuit.
$E_1$ is the voltage to ground, and
$E_2$ is the voltage measured through the shunt circuit.

VICTOR F. HANSON.

REFERENCES CITED

The following references are of record in the file of this patent:

UNITED STATES PATENTS

| Number | Name | Date |
|---|---|---|
| 1,215,867 | Romaim | Feb. 13, 1917 |
| 1,800,474 | Scherer | Apr. 14, 1931 |
| 700,941 | Keith | May 27, 1902 |
| 2,208,329 | Morelock | July 15, 1940 |